United States Patent
Albrecht et al.

[15] 3,699,427
[45] Oct. 17, 1972

[54] PULSE GENERATING DIRECT-CURRENT MEASURING BRIDGES

[72] Inventors: Hermann Friedrich Albrecht, Hotzum; Karl Peter Strauss, Braunschweig, both of Germany

[73] Assignee: Rollei-Werke Franks & Heidecke, Braunschweig, Germany

[22] Filed: July 1, 1971

[21] Appl. No.: 158,956

[30] Foreign Application Priority Data

July 7, 1970    Germany..........P 20 37 518.2

[52] U.S. Cl..............................318/674, 323/75 N
[51] Int. Cl...............................................G05b 11/01
[58] Field of Search.............318/609, 610, 672, 674; 323/75 E, 75 N

[56] References Cited

UNITED STATES PATENTS

| | | |
|---|---|---|
| 2,860,298 | 11/1958 | Carlson...................318/674 X |
| 3,423,602 | 1/1969 | Louis......................323/75 N |
| 2,987,713 | 6/1961 | Bagno.....................323/75 N |
| 3,075,086 | 1/1963 | Mussard..................323/75 E |
| 3,286,144 | 11/1966 | Hill........................318/674 X |
| 3,398,359 | 8/1968 | Weber.....................323/75 N |

*Primary Examiner*—A. D. Pellinen
*Attorney*—Charles Shepard

[57] ABSTRACT

A measuring bridge regulator in which the bridge diagonal circuit has a capacitor, and also, in parallel with the capacitor, a break-through device and the primary winding of an impulse transformer. When the bridge is balanced, there is no charge on the capacitor. When imbalance occurs, a charge builds up in the capacitor, and when the difference in potential in the bridge circuit becomes sufficiently great to cause the break-through device to fire, the capacitor discharges through the primary of the impulse transformer. This creates a pulse in the secondary winding of the transformer, which pulse operates a relay to provide power for an adjusting motor in a direction to tend to restore balance to the measuring bridge.

7 Claims, 2 Drawing Figures

PATENTED OCT 17 1972

3,699,427

PULSE GENERATING DIRECT-CURRENT MEASURING BRIDGES

BACKGROUND OF THE INVENTION

Electrical measuring bridges, of the general type known as a Wheatstone bridge, are often used in controlling or regulating various industrial processes or other variable factors. It is to such bridges that the present invention relates. Such bridges operate on the zero compensation principle. With certain known bridges, the follow-up of the regulator is effected intermittently and at certain intervals of time. With regulators of this kind, the duration of the impulses and the time intervals between them are such that the regulating speed is adapted to the retardation to which the regulating process is subject, in order to avoid oscillation. When the control magnitudes become altered, the measuring bridge is "detuned" or brought into a state of imbalance, and this imbalance is utilized to bring about the follow-up or readjustment of the control magnitudes. With highly retarded control processes, a long time elapses before the adjustment of the controlled magnitude overcomes the imbalance. To avoid over-compensation, therefore, the control process set up by the bridge must be retarded, or sub-divided into individual steps, to the extent necessitated by the inertia of the controlled process. In the past, use has been made of interval switches by which the measuring circuit is switched on and off at certain intervals of time. When the bridge is unbalanced or detuned, therefore, the regulation is effected in small and short steps, and is retarded by the intervals between these steps to such an extent that is adapted to the inertia of the regulated process. The switching times of the interval switch must be selected to ensure that over-regulation is avoided.

An object of the present invention is to provide an efficient and satisfactory regulator which operates without moving parts and without needing an interval switching device such as commonly used in the past as above mentioned, but which nevertheless generates control impulses, the pulse train or the interval between pulses being automatically adapted to the degree of deviation in the measurement, i.e., the amount of the imbalance or the degree of deviation from the desired balanced state.

Another object of the invention is the provision of a regulating device which, in the absence of imbalance, will emit no impulses, and in which the timing of impulses in the case of imbalance is proportional to the degree of imbalance, the control impulses being emitted at a faster rate the greater the degree of imbalance or detuning.

A further object of the invention is the provision of a regulator in which the control impulses are produced to the same intensity and with the same duration, and are also produced selectively with regard to regulation in a forward or reverse direction.

DESCRIPTION OF THE PREFERRED EMBODIMENT

Figure 1:
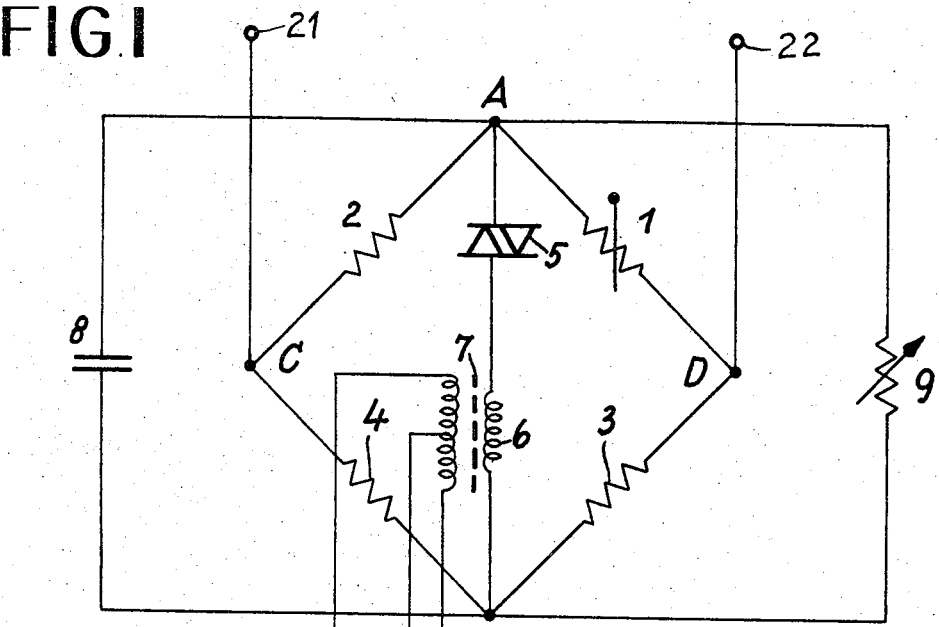
FIG. 1 of the drawing is a wiring diagram schematically illustrating the circuitry of a preferred embodiment of the present invention.

Referring to FIG. 1 the electrical measuring bridge is of the familiar quadrilateral form, containing in its four main arms the ohmic resistors 1, 2, 3, and 4 which may consist of required resistance values which can be set by means of suitable scales, or thermo-resistors or hot conductors (e.g., in the case of heating and ventilating regulators), which are adapted to one another in a manner already known per se in the art, in such a way that in the desired regulated state, equilibrium prevails in the bridge and there is no difference in potential between the points or junctions A and B. The bridge is provided with the usual operating current from the mains or supply connections 21 and 22, supplying direct current to the other two corners C and D of the quadrilateral arms.

In the diagonal balancing circuit or bridge circuit between the points A and B, there is a break-through device 5 which will fire or become conductive when subjected to a predetermined difference of potential on opposite sides, and a primary winding 6 of an impulse transformer 7, in series with the break-through device 5. Also, in parallel with the elements 5 and 6, there is a capacitor 8. Also in parallel with the capacitor 8 and in parallel with the series connected elements 5 and 6, there is preferably an adjustable resistor 9, which may however be omitted if desired.

The secondary winding of the impulse transformer 7 has a central tap. Circuit conductors go from the central tap and from the respective ends of the secondary winding to the respective diodes 10 and 11, and through them to the respective windings 12 and 13 of self-holding relays of the known type in which, upon actuation of the windings 12 and 13, the relay will be held closed for a predetermined time interval after current has ceased to flow through the winding 12 or 13. The relays, when closed, will supply operating current from the mains 14 and 15 to the adjusting or regulating motor M to operate the motor in one direction or the other, depending upon which relay is closed. The motor, in turn, adjusts one of the variables of the process or operation which is being regulated by the present regulator. For example, the motor may move a damper in an opening or closing direction, or adjust a valve, or adjust an electrical resistance.

The operation is as follows: in the balanced state, there is no voltage or difference in potential between the bridge points A and B; therefore the capacitor 8 has no charge. But when a detuning or imbalance occurs (e.g., in the form of a change in the resistance of the resistor 1, or a readjustment of a thermo-resistor or change in the conductivity of one of the other elements 2, 3, or 4 in the arms of the bridge) then a potential difference will occur between the points A and B, and the capacitor 8 becomes charged. At the moment when the voltage across the capacitor has approximately reached the ignition voltage of the break-through device 5, this device cuts through or fires, and the capacitor 8 discharges through the primary winding 6 of the impulse transformer 7. The impulse produced in the secondary winding of the transformer is passed through one or the other of the diodes 10 and 11, depending upon the polarity, to operate one or the other of the windings of the self-holding relays, to switch the motor M to operate in a forward or reverse direction, for an interval of time which is determined by the release retardation of the relays 12 and 13. If the detuning or imbalance condition of the bridge continues, this process is repeated when the capacitor 8 has had time to become recharged sufficiently to cause the break-through device 5 to fire once more. The time is governed in part by the time constant of the capacitor 8 and of the bridge resistances. Also, it is influenced by the resistor 9, if such a resistor is included. The lower the resistance of the resistor 9, the longer it will take the capacitor 8 to become charged sufficiently to operate the break-through device 5 and activate the transformer 7. The greater the degree of imbalance of the bridge, the faster the capacitor 8 will become recharged sufficiently to activate the transformer, and the faster will be the successive operations of the follow-up motor M. Thus the regulating apparatus automatically operates at a time sequence proportional to the degree of detuning or imbalance of the bridge; the greater the degree or intensity of imbalance, the quicker the succession of the regulating impulses.

Figure 2:
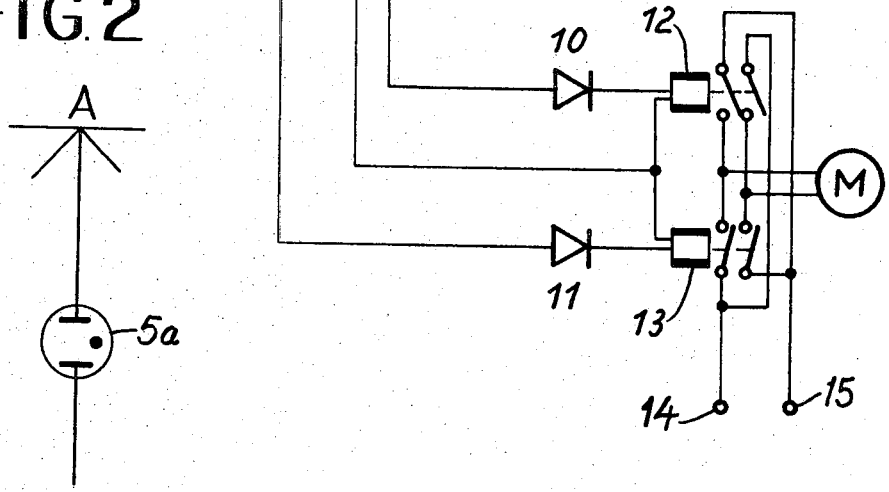
FIG. 2 is a wiring diagram corresponding to a fragment of FIG. 1, illustrating a modification using a glow lamp in place of the diac illustrated in FIG. 1.

The element 5 has been described above merely as a break-through device. A very satisfactory form of such device is a diac, well known in the electronic field. However, other break-through devices of known kind may be used, e.g., certain known forms of glow tube, as shown by 5a in FIG. 2.

What is claimed is:

1. A pulse generating measuring bridge or the like comprising an electrical bridge having arms containing resistances at least one of which is responsive to a magnitude to be regulated, a diagonal bridge circuit connecting two diagonally opposite points of said arms, said diagonal bridge circuit including a capacitor charged in response to an imbalance producing a difference in potential between said two points, a break-through device and an impulse transformer primary winding in series with each other and in parallel with said capacitor, said capacitor being discharged through said break-through device and said primary winding to produce an impulse in a secondary winding of said transformer when the charge on said capacitor reaches a threshold value sufficient to cause firing of said break-through device, said secondary winding having a central tap, and regulating means operable in response to an impulse in said secondary winding, said regulating means including an electric motor for regulating a variable magnitude to which said electrical bridge is responsive, a first relay for causing operation of said motor in a first direction, a second relay for causing operation of said motor in an opposite direction, and relay operating circuit connections including a conductor from said central tap to both of said relays, a conductor from one end of said secondary winding to said first relay, and a conductor from the opposite end of said secondary winding to said second relay.

2. A regulator as defined in claim 1, wherein said break-through device is a diac.

3. A regulator as defined in claim 1, wherein said break-through device is a glow lamp.

4. A regulator as defined in claim 1, wherein said bridge circuit includes a resistor in parallel with said capacitor for influencing the time required for said capacitor to become charged to said threshold value.

5. A regulator as defined in claim 4, wherein said resistor in parallel with said capacitor is a variable resistor.

6. A regulator as defined in claim 1, further including a diode in each of said conductors from the ends of said secondary winding to their respective relays.

7. A regulator as defined in claim 1, wherein each of said relays is a self-holding relay remaining closed for a predetermined time interval after termination of an impulse which has served to close the relay to operate said motor.

* * * * *

UNITED STATES PATENT OFFICE
CERTIFICATE OF CORRECTION

Patent No. 3,699,427      Dated October 17, 1972

Inventor(s) Hermann Friedrich Albrecht et al

It is certified that error appears in the above-identified patent and that said Letters Patent are hereby corrected as shown below:

On the cover sheet [73] the name of the assignee should read -- Rollei-Werke Franke & Heidecke --.

Signed and sealed this 1st day of May 1973.

(SEAL)
Attest:

EDWARD M. FLETCHER, JR.          ROBERT GOTTSCHALK
Attesting Officer                Commissioner of Patents